United States Patent
Huang et al.

(10) Patent No.: US 12,325,812 B2
(45) Date of Patent: Jun. 10, 2025

(54) METHOD FOR PREPARING LIGNIN ADHESIVE AND PRODUCT THEREOF

(71) Applicant: INSTITUTE OF CHEMICAL INDUSTRY OF FOREST PRODUCTS, CAF, Nanjing (CN)

(72) Inventors: Chen Huang, Nanjing (CN); Fangmin Liang, Nanjing (CN); Xuelian Zhou, Nanjing (CN); Jinyuan Cheng, Nanjing (CN); Yunni Zhan, Nanjing (CN); Wencan Ma, Nanjing (CN); Xuze Liu, Nanjing (CN); Yongjun Deng, Nanjing (CN); Guigan Fang, Nanjing (CN)

(73) Assignee: INSTITUTE OF CHEMICAL INDUSTRY OF FOREST PRODUCTS, CAF, Nanjing (CN)

( * ) Notice: Subject to any disclaimer, the term of this patent is extended or adjusted under 35 U.S.C. 154(b) by 0 days.

(21) Appl. No.: 18/839,741

(22) PCT Filed: Jun. 9, 2023

(86) PCT No.: PCT/CN2023/099361
§ 371 (c)(1),
(2) Date: Aug. 20, 2024

(87) PCT Pub. No.: WO2023/246524
PCT Pub. Date: Dec. 28, 2023

(65) Prior Publication Data
US 2025/0109327 A1    Apr. 3, 2025

(30) Foreign Application Priority Data
Jun. 24, 2022 (CN) .......................... 202210733525.0

(51) Int. Cl.
C09J 197/00    (2006.01)
C08H 3/00    (2006.01)
C08H 7/00    (2011.01)

(52) U.S. Cl.
CPC ............ *C09J 197/005* (2013.01); *C08H 6/00* (2013.01)

(58) Field of Classification Search
CPC ................................ C09J 197/005; C08H 6/00
USPC ........................................................ 530/507
See application file for complete search history.

(56) References Cited

U.S. PATENT DOCUMENTS

| | | |
|---|---|---|
| 5,021,531 A | 6/1991 | Schroeder |
| 2004/0220368 A1 | 11/2004 | Li et al. |
| 2014/0163142 A1 | 6/2014 | Zhang et al. |

FOREIGN PATENT DOCUMENTS

| | | | |
|---|---|---|---|
| CN | 103031108 A | | 4/2013 |
| CN | 110845715 A | * | 2/2020 |

(Continued)

OTHER PUBLICATIONS

Liu et al., CN 110845715 A machine translation in English, Feb. 28, 2020. (Year: 2020).*

(Continued)

*Primary Examiner* — David T Karst
(74) *Attorney, Agent, or Firm* — Bayramoglu Law Offices LLC

(57) ABSTRACT

A method for preparing a lignin adhesive and a product thereof are provided. The method includes: treating a wood fiber raw material with a mixed solution; after the treatment, adding an organic solvent to perform a solid-liquid separation while stirring, subjecting an obtained liquid to a rotary evaporation to remove the organic solvent, and washing and drying the product to obtain the lignin adhesive. The method can remove a large amount of lignin from wood fiber raw (Continued)

materials at a low temperature, and in the process of lignin removal, the lignin adhesive is formed by the cross-linking reaction with the solvent in the system, realizing the separation of lignin and the formation of lignin adhesive simultaneously. And the method is simple, has low cost and high yield, and can realize the large-scale preparation of lignin adhesive and the efficient removal of lignin.

16 Claims, 4 Drawing Sheets

(56) References Cited

FOREIGN PATENT DOCUMENTS

| CN | 112778539 A | 5/2021 |
|---|---|---|
| CN | 113307983 A | 8/2021 |
| CN | 113426388 A | 9/2021 |
| CN | 113666471 A | 11/2021 |
| CN | 115029104 A | 9/2022 |

OTHER PUBLICATIONS

Xie Panpan, et al., Modification of lignin-phenol-formaldehyde adhesive with ChCl /Glycerol deep-eutectic solvent, Journal of Forestry Engineering, 2016, pp. 107-113, vol. 1 No. 4.

Veronika Majova, et al., Delignification of unbleached pulp by ternary deep eutectic solvents, Green Processing and Synthesis, 2021, pp. 666-676, Nol. 10.

* cited by examiner

METHOD FOR PREPARING LIGNIN ADHESIVE AND PRODUCT THEREOF

CROSS REFERENCE TO THE RELATED APPLICATIONS

This application is the national phase entry of International Application No. PCT/CN2023/099361, filed on Jun. 9, 2023, which is based upon and claims priority to Chinese Patent Application No. 202210733525.0, filed on Jun. 24, 2022, the entire contents of which are incorporated herein by reference.

TECHNICAL FIELD

The invention relates to the technical field of clean separation and efficient comprehensive utilization of wood fiber raw materials, in particular to a method for preparing lignin adhesive and a product thereof.

BACKGROUND

At present, phenolic resin-based adhesives are the main industrial adhesives. Phenolic resin-based adhesives are mainly prepared by the reaction of phenol and formaldehyde, have advantages of long bonding time and strong water resistance, and are widely used in various wood products, metal products, plastic products, and other fields. However, formaldehyde poses a certain threat to human life and health, and phenol from the petrochemical industry easily causes pollution and other problems. In recent years, the use of environmentally friendly and renewable raw materials to prepare adhesives to replace the traditional phenolic resin-based adhesives has been widely studied. Specifically, soy-based adhesives derived from biomass have been industrialized because of their advantages of low price, environmental protection, non-toxicity, biodegradability, etc., but soy-based adhesives have low solid content, high viscosity, and weak overall adhesion. In the actual production process, soy-based adhesives have some shortcomings, such as long hot-pressing time and unstable bonding strength after hot pressing. In order to overcome the shortcomings of soy-based adhesives, the production of adhesives similar to traditional phenolic resins using lignin as a raw material has been widely studied.

Lignin is the most widely sourced phenolic compound in nature. Its basic components (syringyl, guaiacyl, and p-hydroxyphenyl) are similar in structure to phenol in phenolic resin-based adhesives and have the potential to replace phenolic resin-based adhesives. The content of lignin in wood fiber raw materials is 15%-35%, and it has the advantages of large reserves, being renewable, and easy degradation. There are about 80 million tons of industrial lignin wastes in the world every year (mainly from pulping and paper making and biomass refining). The utilization rate of lignin is low at this stage, mainly used for combustion heating. Only 2% of lignin is effectively used, so seeking efficient lignin application methods is conducive to improving the high value-added utilization of wood fiber biomass.

Lignin adhesive is a kind of lignin-based polymer that has strong adhesion properties and can realize the adhesion of wood products, metal products, and plastic products, so it has a good application prospect in construction, home furnishing, materials, and other fields. At present, the research on lignin-based adhesives is still in its infancy, mainly because traditional industrial lignin has a complex structure, low purity, few reaction sites, high steric hindrance, etc. Relevant chemical modifications, such as phenolization and demethylation, need to be carried out during the use of traditional industrial lignin, which has shortcomings such as a complex preparation process, high energy consumption, and large chemical consumption. These shortcomings lead to high production costs and difficult industrialization. In addition, this process usually still requires the use of formaldehyde, glyoxal, glutaraldehyde, and other toxic chemicals, which is still difficult to be widely accepted by consumers. Therefore, finding a simpler, greener, and low-cost lignin adhesive preparation method is the key to its industrialization.

SUMMARY

Technical Problem

In view of the problems of high cost and high toxicity of the existing preparation methods of lignin adhesive, the technical problem to be solved in this application is to provide a method of clean preparation of a lignin adhesive. In the process of lignin separation, lignin is directly converted into adhesive through a series of cross-linking reactions. Another technical problem to be solved in this application is the provision of a lignin adhesive obtained by the above method.

Technical Solution

In order to solve the above technical problems, the technical scheme of the invention is as follows:

A method for preparing lignin adhesive, including: treating a wood fiber raw material with a mixed solution; after the treatment, adding an organic solvent to perform a solid-liquid separation while stirring, subjecting an obtained liquid to a rotary evaporation to remove the organic solvent, and washing and drying the product to obtain the lignin adhesive; where the mixed solution is a homogeneous transparent liquid composed of a hydrogen bond receptor, a polyol, and an organic polyacid.

The hydrogen bond receptor is selected from choline chloride, benzyltrimethylammonium chloride, betaine, etc.

The polyol is selected from 1,2-butanediol, 1,2-pentanediol, 1,5-pentanediol, 1,3-propanediol, 1,5-butanediol, and other polyhydroxyl alcohols.

The organic polyacid is selected from maleic acid, succinic acid, malonic acid, and other polyacids.

The molar ratio of the hydrogen bond receptor to the polyol, to the organic polyacid is (0.1-5):(0.1-5):(0.1-5).

The mass ratio of the wood fiber raw material to the mixed solution is (1:1)-(1:20).

The wood fiber raw material is mixed with the mixed solution and reacts at 80° C.-140° C. for 10 min-60 min.

The organic solvent is an ethanol or acetone aqueous solution with a volume concentration of 10%-100%, and the amount of organic solvent added is 2-10 times the volume of the mixed solution.

The method for preparing the lignin adhesive includes the following steps:

1) preparation of the mixed solution mixing the hydrogen bond receptor, the polyol, and the organic polyacid, heating at 50° C.-110° C. and stirring continuously until a clarified and homogeneous mixed solution is formed; where the hydrogen bond receptor is selected from choline chloride, benzyltrimethylammonium chloride, betaine, etc., the polyol is selected from 1,2-butanediol, 1,2-pentanediol, 1,5-pentanediol, 1,3-propanediol, 1,5-butanediol, and other polyhydroxyl alcohols, and the organic polyacid is selected from maleic acid, succinic acid, malonic acid, etc, the molar ratio of the hydrogen bond receptor to the polyol, to the organic polyacid is (0.1-5):(0.1-5):(0.1-5);

2) treatment of the wood fiber raw material weighing the wood fiber raw material and mixing it with the mixed solution in proportion, conducting a reaction at 90° C.-140° C.; after the reaction, adding the organic solvent into the system, stirring well, achieving the solid-liquid separation by filtering to obtain a pretreated material and a pretreated solution;

3) separation of the lignin adhesive performing the solid-liquid separation to obtain lignin-rich pretreated solution and pretreated material; washing the pretreated material with distilled water to neutral and then recycling; subjecting the lignin-rich pretreated solution to a rotary evaporation to remove the organic solvent, adding appropriate deionized water to precipitate lignin, then centrifuging to separate and obtain the lignin adhesive.

In step 3), after the lignin is recovered, the pretreated solution can be recycled after evaporation to remove the water in it.

The lignin adhesive obtained by the method of preparing the lignin adhesive.

The wood fiber raw material includes agricultural waste such as wheatgrass, straw, and corn straw, forest biomass such as poplar and Chinese fir, and fast-growing gramineae such as reed and bamboo.

The preparation of the lignin adhesive first requires the separation of lignin. The applicant found through research that the mixed solution formed by polyol (1,2-butanediol, 1,2-pentanediol, 1,5-pentanediol, 1,3-propanediol, 1,5-butanediol, etc.) and choline chloride has almost no effect on the separation of components of wood fiber raw material. However, by adding organic polyacid (maleic acid, malic acid, citric acid, succinic acid, malonic acid, etc.) to the above system, the lignin polymer separated can be directly used as the lignin adhesive, which avoids the chemical remodification of lignin and the introduction of toxic substances in the preparation process of conventional methods, and is a new and efficient method for preparing the lignin adhesive.

Beneficial Effect

Compared with the prior art for preparing the lignin adhesive, this application has the following technical advantages:

1) This application can remove a large amount of lignin in wood fiber raw materials at a low temperature, and in the process of lignin removal, the lignin adhesive is formed by the cross-linking reaction with the solvent in the system, realizing the simultaneous separation of lignin and the formation of lignin adhesive. And the method is simple, low cost, and high yield, and can realize the large-scale preparation of lignin adhesive and the efficient removal of lignin.

2) The lignin adhesive prepared in this application can realize the bonding of polypropylene, pigskin, rubber, glass, stainless steel metal, and other materials, and the shear strength after bonding is 1.42 kPa-216.99 kPa, which is a kind of good lignin adhesive.

DETAILED DESCRIPTION OF THE EMBODIMENTS

The present invention is further elaborated in combination with specific embodiments. Embodiments are illustrative of, rather than limiting, the invention. These embodiments are understood by any ordinary scientific and technical personnel in the field to not limit the invention in any way and may be modified as appropriate without contravening the substance of the invention or deviating from the scope of the invention.

Example 1

A method for preparing a lignin adhesive, including the following steps:

1) mixing choline chloride, polyol (1,2-butanediol, 1,2-pentanediol, 1,5-pentanediol, 1,4-butanediol), and maleic acid at a molar ratio of 1:1:1, heating at 80° C. until a homogeneous, transparent mixed solution is formed.

2) mixing bamboo powder with the mixed solution according to a mass ratio of 1:10, conducting a reaction at 110° C. for 4 h. After the pretreatment, adding 5 times the volume of ethanol/aqueous solution (the volume fraction of the ethanol is 50%), and stirring for 1 h.

3) performing a solid-liquid separation to obtain lignin-rich pretreated solution and pretreated material. After the pretreated material was washed in distilled water to neutral, analyzing the content of main components of the pretreated material, and calculating the lignin removal rate.

4) subjecting the lignin-rich pretreated solution to a rotary evaporation at 65° C. to remove ethanol from it, and adding appropriate deionized water to precipitate lignin. Centrifuging the pretreated solution after ethanol removal to separate and obtain the lignin adhesive for analysis.

Figure 1A:
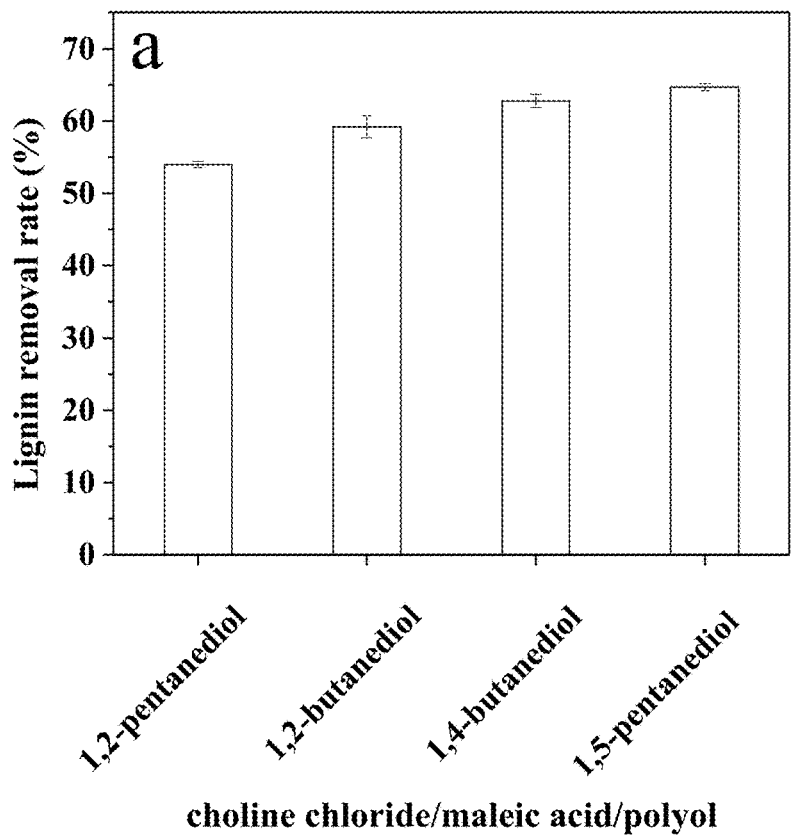
FIGS. 1A-1B show results of lignin removal rate (FIG. 1A) and lignin adhesive recovery yield (FIG. 1B) of the method in Embodiment 1.
Figure 1B:
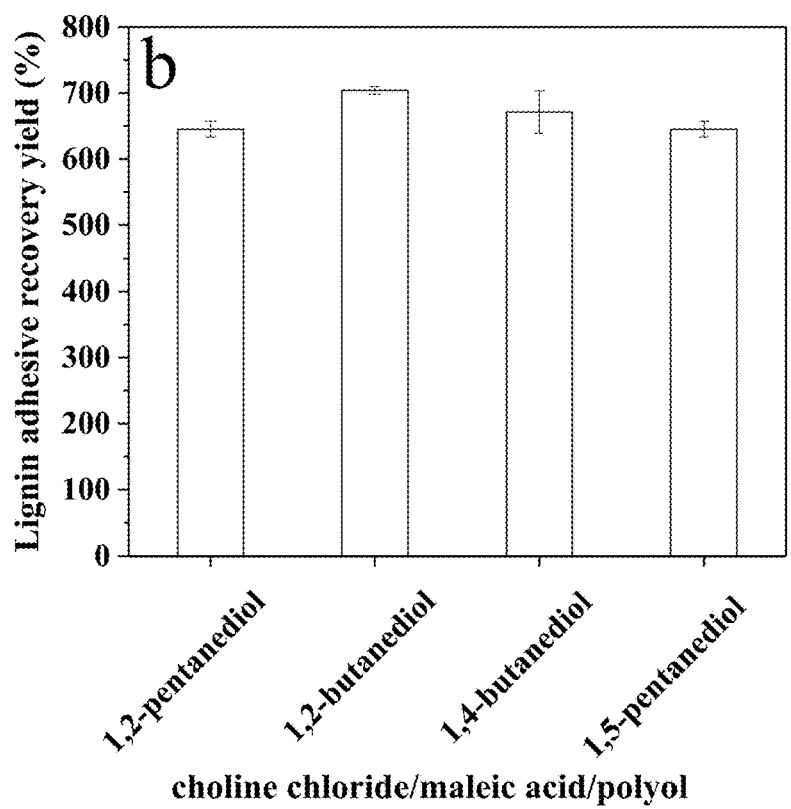

As shown in FIG. 1A, after pretreatment with different choline chloride/maleic acid/polyol, the lignin removal rate increased from 53.98% (choline chloride/maleic acid/1,2-pentanediol) to 59.21% (1,2-butanediol) and 62.79% (choline chloride/maleic acid/1,4-butanediol) and 64.71% (choline chloride/maleic acid/1,5-pentanediol), indicating that different polyols and different isomers of the same polyol (hydroxyl position) have a great effect on the lignin removal rate. In addition, after rotary evaporation of the pretreated solution, removal of acetone, addition of appropriate amount of deionized water and centrifugation, the separated lignin adhesive was obtained, and the recovery yield of lignin adhesive was shown in FIG. 1B. It can be seen from the figure that the recovery yield of lignin adhesive (relative to the removed lignin in the system) is more than 6 times that of the removed lignin, indicating that the removed lignin was grafted with hydrogen donors such as polyol and maleic acid in the mixed solution, and the recovery yield of the lignin adhesive increases first and then decreases, and the maximum value is 703.99% in the 1,2-butanediol system. It shows that the reaction degree of lignin with hydrogen donor in different mixed solutions is different.

The tensile test of the obtain lignin adhesive was carried out using a microcomputer controlled material universal testing machine. Polypropylene plastic-polypropylene plastic was selected as the tensile material, and the polypropylene plastic sheet was cut into strips with a width of 25 mm and a length of 100 mm. The lignin adhesive coating area was 25 mm×25 mm and the thickness was 0.2 mm.

Figure 2A:
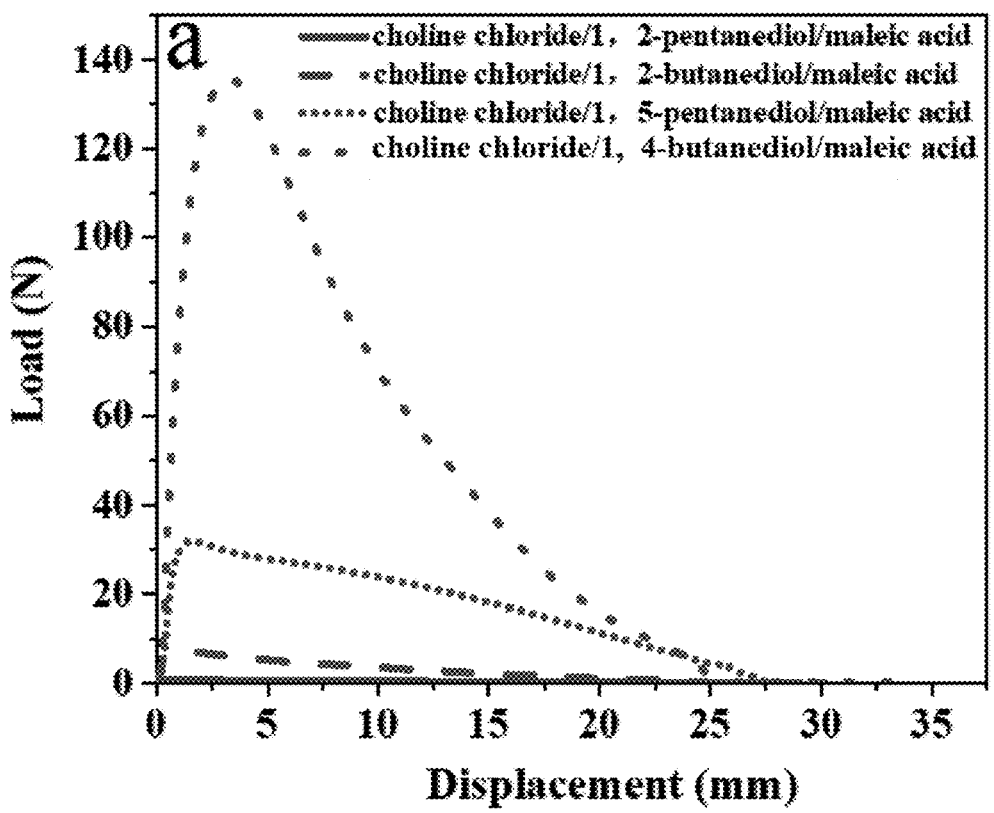
FIGS. 2A-2B show changes of tensile load of lignin adhesives of different polyol systems with displacement (FIG. 2A) and shear strengths of lignin adhesives of different polyol systems (FIG. 2B).
Figure 2B:
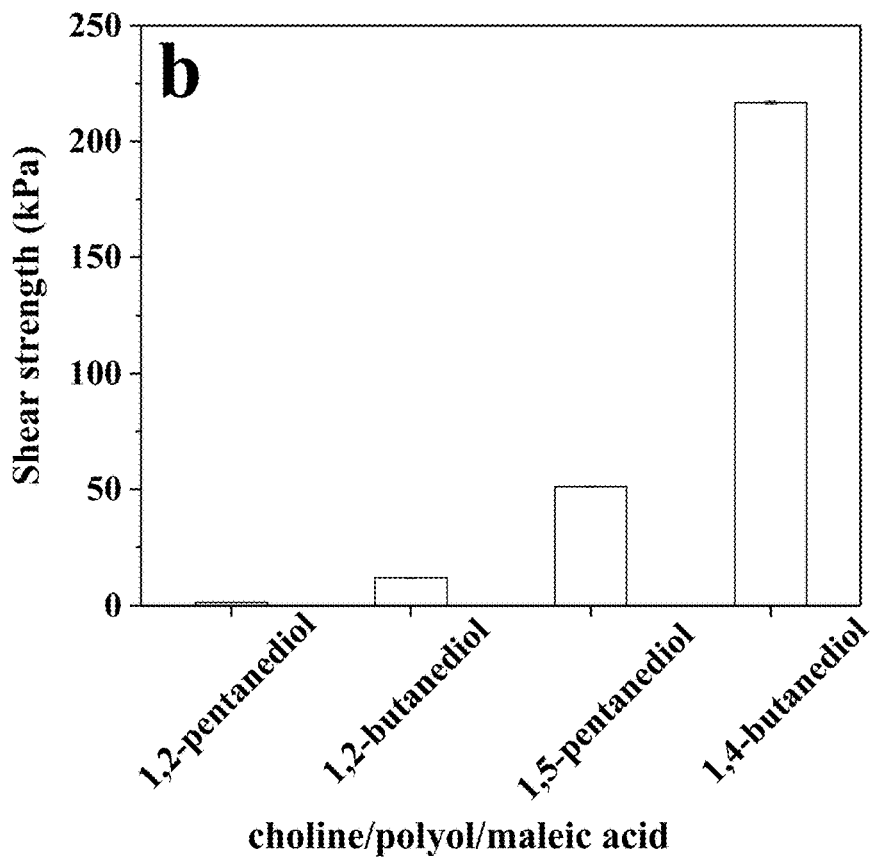

As shown in FIGS. 2A-2B, the bonding strength of lignin adhesive recovered after pretreatment with different polyol based mixed solutions on polypropylene plastics was significantly different, among which the lignin adhesive recovered from choline chloride/1,4-butanediol/maleic acid mixed solution had the best effect, with a maximum load of 135.62 N and a shear strength of 216.785 kPa. When the system was changed to choline chloride/1,5-pentanediol/maleic acid, the maximum load was significantly lower (31.84 N), and the shear strength decreased to 51.08 kPa. When the isomers of the polyols mentioned above were used, the maximum tensile loads of the recovered lignin adhesions (choline chloride/1,2-butanediol/maleic acid and choline chloride/1,2-pentanediol/maleic acid) after bonding to polypropylene plastics were reduced to 7.39 N and 0.89 N, respectively, and the maximum shear strength decreased to 11.99 kPa and 1.44 kPa. The above results show that the bonding strength of lignin adhesive recovered after mixed solution pretreatment is mainly affected by the structure of polyols, in which the influence of the position of hydroxyl group is more obvious. It is because polyols with two hydroxyl groups at both ends are easier to esterify with maleic acid in the mixed solution in pretreatment process, and are easier to graft to the a position of the lignin aliphatic side chain. These reactions are conducive to the branching of the lignin molecular chain and increase its adhesion properties.

Example 2

A method for preparing a lignin adhesive, including the following steps:
1) mixing choline chloride, 1,4-butanediol, and maleic acid at a molar ratio of 1:1:1, heating at 80° C. until a homogeneous, transparent mixed solution is formed.
2) mixing bamboo powder with the mixed solution according to a mass ratio of 1:10, conducting a reaction at 110° C. for 4 h. After the pretreatment, adding 5 times the volume of ethanol/aqueous solution (the volume fraction of the ethanol is 50%), and stirring for 1 h.
3) performing a solid-liquid separation to obtain lignin-rich pretreated solution and pretreated material. After the pretreated material was washed in distilled water to neutral, analyzing the content of main components of the pretreated material, and calculating the lignin removal rate.
4) subjecting the lignin-rich pretreated solution to a rotary evaporation at 65° C. to remove ethanol from it, and adding appropriate deionized water to precipitate lignin. Centrifuging the pretreated solution after ethanol removal to separate and obtain the lignin adhesive for analysis.

Figure 3A:
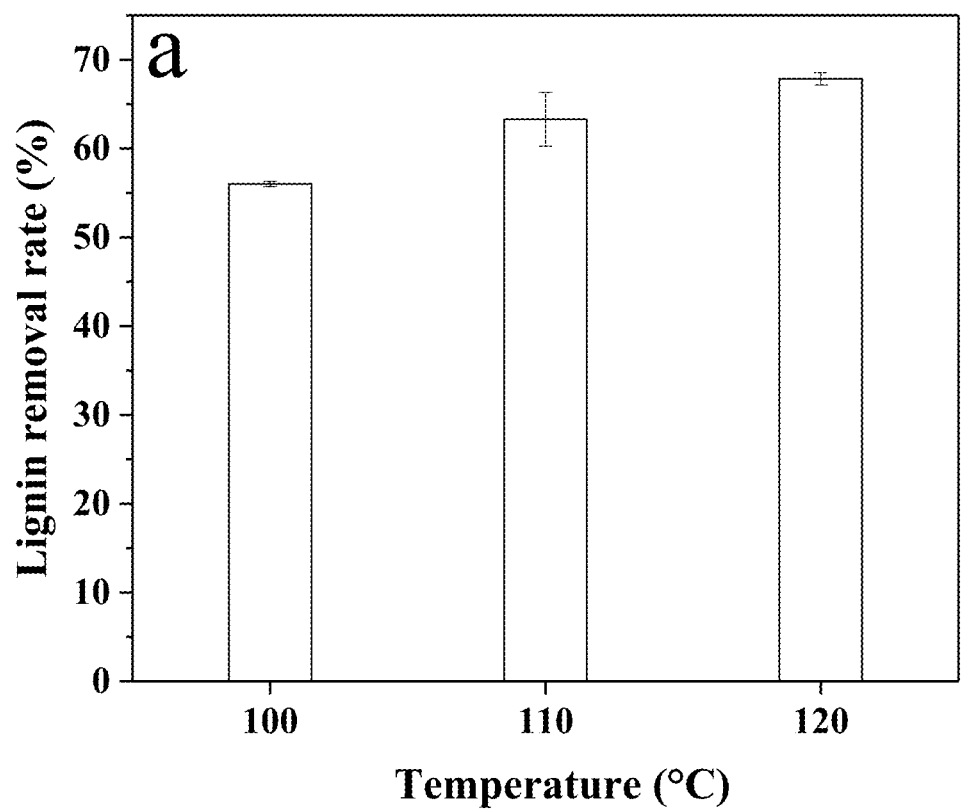
FIGS. 3A-3B show results of lignin removal rate (FIG. 3A) and lignin adhesive recovery yield (FIG. 3B) in the pretreatment process of Embodiment 2.
Figure 3B:
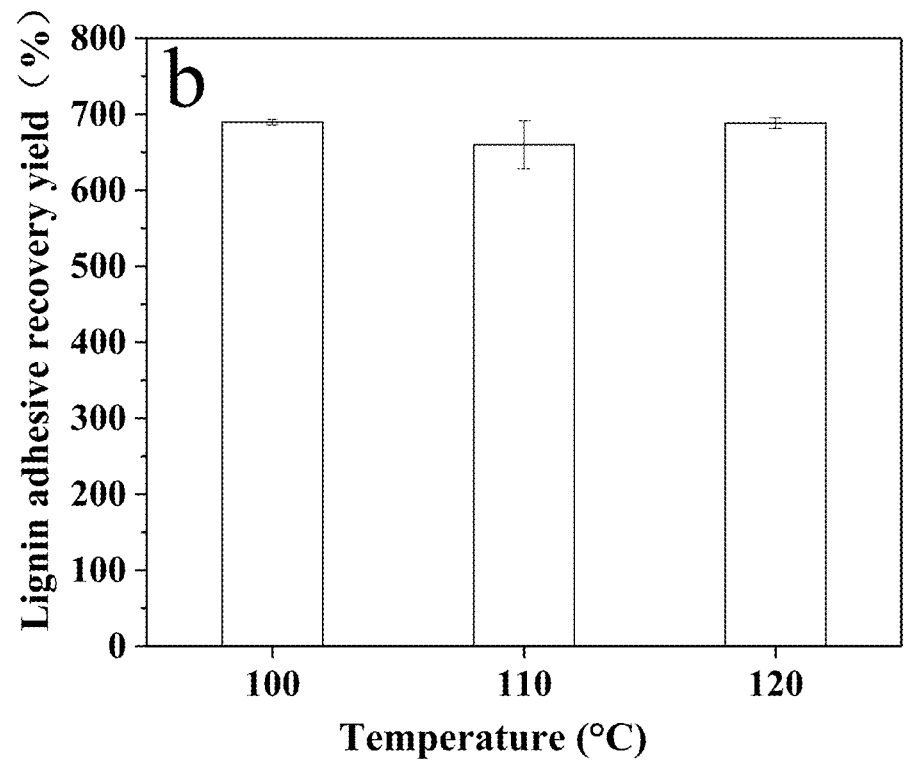

As shown in FIG. 3A, during the pretreatment process, as the temperature increased from 100° C. to 120° C., the lignin removal rate increased from 56.01% (100° C.) to 63.29% (110° C.) and 67.85% (120° C.), indicating that the increase of temperature was conducive to the degradation of lignin. In addition, after rotary evaporation of the pretreated solution, removal of ethanol, and addition of appropriate deionized water, lignin adhesive was precipitation. The recovery yield of lignin adhesive (relative to the removed lignin in the system) was shown in FIG. 3B. Similar to different polyol systems, the recovery yield of lignin adhesive after pretreatment was above 600%, and showed a trend of first decreasing and then increasing with the increase of temperature, the maximum value is 689.57%.

The tensile test of the obtain lignin adhesive was carried out using a microcomputer controlled material universal testing machine. Polypropylene plastic-polypropylene plastic, pigskin-pigskin, and pigskin-polypropylene plastic were selected as the tensile material, and the polypropylene plastic and the pigskin were cut into strips with a width of 25 mm and a length of 100 mm. The lignin adhesive coating area was 25 mm×25 mm and the thickness was 0.2 mm.

Figure 4A:
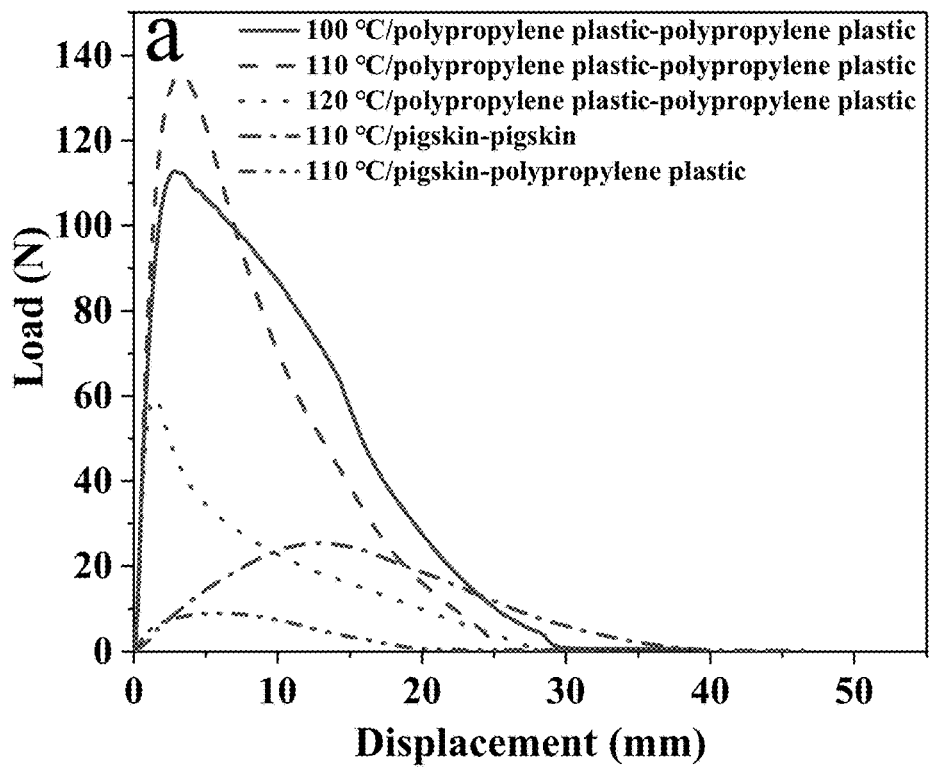
FIGS. 4A-4B show changes of tensile load of lignin adhesives bonded to different materials in systems with different pretreatment temperature with displacement (FIG. 4A) and shear strengths of lignin adhesives bonded to different materials in systems with different pretreatment temperature (FIG. 4B).
Figure 4B:
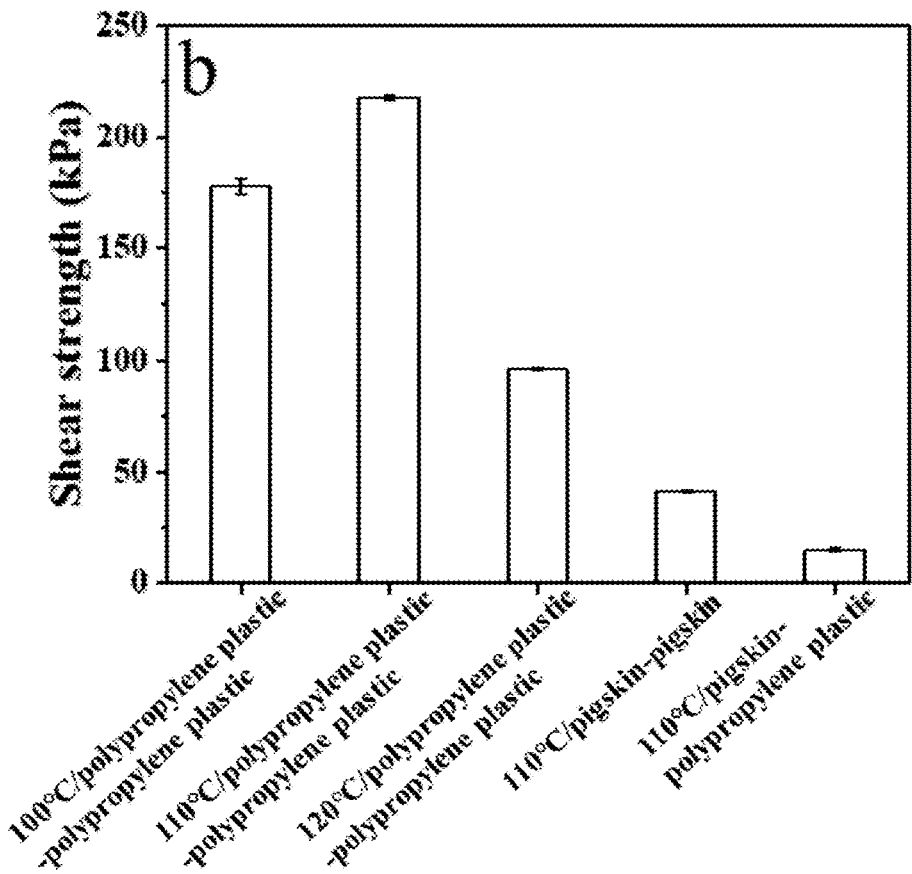

As shown in FIGS. 4A-4B, when the pretreatment temperature was increased from 100° C. to 120° C., the adhesion properties of lignin adhesive first increased and then decreased. The maximum bonding load of lignin adhesive on polypropylene plastic-polypropylene plastic increased from 112.73 N (100° C.) to 135.62 N (110° C.) and then decreased to 59.77 N (120° C.). The shear strength increased from 180.38 kPa to 216.99 kPa and then decreased to 95.64 kPa. The results showed that the pretreatment temperature had a great influence on the adhesion properties of lignin adhesive. When the pretreatment temperature was low, the branching reaction between lignin and 1,4-butanediol and maleic acid in the system was less, and the bonding strength of lignin adhesive was weak. With the increase of pretreatment intensity, the branching reaction of lignin with 1,4-butanediol and maleic acid increased, which led to the increase of the bonding strength of lignin adhesive. When the temperature continued to increase, the depolymerization of lignin at high temperature was enhanced, the degree of lignin fragmentation was increased, and the molecular chain of lignin adhesive became shorter, and the bonding strength decreased.

The lignin adhesive recovered in this example was selected to have the best bonding effect on polypropylene plastic at 110° C., and the bonding experiment was carried out on pigskin-pigskin and pigskin-polypropylene plastic (same method as above). The results showed that the bonding effect between polypropylene plastics was the best, and the maximum load and shear strength were 135.62 N and 180.38 kPa, respectively; the bonding effect between pigskins was the second, 25.37 N and 40.59 kPa; the bonding effect between pigskin and polypropylene plastic was the worst at 9.02 N and 14.43 kPa.

Comparison Example 1

To compare the properties of lignin separated under other polyol and organic acid systems, the steps are as follows:
1) mixing choline chloride/1,4-butanediol/citric acid and choline chloride/1,4-butanediol/oxalic acid at a molar ratio of 1:1:1, heating at 80° C., stirring continuously until a homogeneous, transparent mixed solution is formed.
2) mixing bamboo powder with the mixed solution according to a mass ratio of 1:10, conducting a reaction at 110° C. for 4 h. After the pretreatment, adding 5 times the volume of ethanol/aqueous solution (the volume fraction of the ethanol is 50%), and stirring for 1 h.
3) performing a solid-liquid separation to obtain lignin-rich pretreated solution and pretreated material. After the pretreated material was washed in distilled water to neutral, analyzing the content of main components of the pretreated material, and calculating the lignin removal rate.
4) subjecting the lignin-rich pretreated solution to a rotary evaporation at 65° C. to remove ethanol from it, and adding appropriate deionized water to precipitate lignin. Centrifuging the pretreated solution after ethanol removal to separate and obtain the lignin.

The results showed that although choline chloride/1,4-butanediol/citric acid and choline chloride/1,4-butanediol/oxalic acid systems could achieve a large amount of lignin removal from bamboo, the lignin removed mainly existed in the form of powder and had no adhesive properties.

What is claimed is:

1. A method for preparing a lignin adhesive, comprising: treating a wood fiber raw material with a mixed solution; after a treatment, adding an organic solvent to perform a solid-liquid separation while stirring, subjecting an obtained liquid to a rotary evaporation to remove the organic solvent, and washing and drying a product to obtain the lignin adhesive; wherein the mixed solution is a homogeneous transparent liquid composed of a hydrogen bond receptor, a polyol, and an organic polyacid, and wherein the polyol is selected from 1, 2-butanediol, 1, 2-pentanediol, 1, 5-pentanediol, 1, 3-propanediol, and 1, 4-butanediol.

2. The method for preparing the lignin adhesive according to claim 1, wherein the hydrogen bond receptor is selected from choline chloride, benzyltrimethylammonium chloride, and betaine.

3. The method for preparing the lignin adhesive according to claim 1, wherein the organic polyacid is selected from maleic acid, succinic acid, malonic acid, and other polybasic organic acids.

4. The method for preparing the lignin adhesive according to claim 1, wherein a molar ratio of the hydrogen bond receptor to the polyol, to the organic polyacid is (0.1-5):(0.1-5):(0.1-5).

5. The method for preparing the lignin adhesive according to claim 1, wherein a mass ratio of the wood fiber raw material and the mixed solution is (1:1)-(1:20).

6. The method for preparing the lignin adhesive according to claim 1, wherein the wood fiber raw material is mixed with the mixed solution and reacts at 80° C.-140° C. for 10 min-300 min.

7. The method for preparing the lignin adhesive according to claim 1, wherein the organic solvent is an ethanol or acetone aqueous solution with a volume concentration of 10%-100%, and an amount of the organic solvent added is 2-10 times a volume of the mixed solution.

8. The method for preparing the lignin adhesive according to claim 1, comprising the following steps:
1) a preparation of the mixed solution
mixing the hydrogen bond receptor, the polyol, and the organic polyacid, heating at 50° C.-110° C. and stirring continuously until a clarified and homogeneous mixed solution is formed; wherein the hydrogen bond receptor is selected from choline chloride, benzyltrimethylammonium chloride, and betaine; the polyol is selected from 1, 2-butanediol, 1, 2-pentanediol, 1, 5-pentanediol, 1, 3-propanediol, and 1, 4-butanediol; and the organic polyacid is selected from maleic acid, succinic acid, malonic acid, and other polyacids; a molar ratio of the hydrogen bond receptor to the polyol, to the organic polyacid is (0.1-5):(0.1-5):(0.1-5);
2) the treatment of the wood fiber raw material
weighing the wood fiber raw material and mixing the wood fiber raw material with the mixed solution in proportion, conducting a reaction at 90° C.-140° C. for 10 min-300 min; after the reaction, adding the organic solvent into a system, stirring well, achieving the solid-liquid separation by filtering to obtain a pretreated material and a pretreated solution;
3) a separation of the lignin adhesive
performing the solid-liquid separation to obtain a lignin-rich pretreated solution and the pretreated material; washing the pretreated material with distilled water to neutral and then recycling; subjecting the lignin-rich pretreated solution to the rotary evaporation to remove the organic solvent, adding appropriate deionized water to precipitate lignin, then centrifuging to separate and obtain the lignin adhesive.

9. A lignin adhesive obtained by a method for preparing the lignin adhesive, the method comprising: treating a wood fiber raw material with a mixed solution; after the treatment, adding an organic solvent to perform a solid-liquid separation while stirring, subjecting an obtained liquid to a rotary evaporation to remove the organic solvent, and washing and drying a product to obtain the lignin adhesive; wherein the mixed solution is a homogeneous transparent liquid composed of a hydrogen bond receptor, a polyol, and an organic polyacid, and wherein the polyol is selected from 1, 2-butanediol, 1, 2-pentanediol, 1, 5-pentanediol, 1, 3-propanediol, 1, 4-butanediol.

10. The lignin adhesive according to claim 9, wherein in the method for preparing the lignin adhesive, the hydrogen bond receptor is selected from choline chloride, benzyltrimethylammonium chloride, and betaine.

11. The lignin adhesive according to claim 9, wherein in the method for preparing the lignin adhesive, the organic polyacid is selected from maleic acid, succinic acid, malonic acid, and other polybasic organic acids.

12. The lignin adhesive according to claim 9, wherein in the method for preparing the lignin adhesive, a molar ratio of the hydrogen bond receptor to the polyol, to the organic polyacid is (0.1-5):(0.1-5):(0.1-5).

13. The lignin adhesive according to claim 9, wherein in the method for preparing the lignin adhesive, a mass ratio of the wood fiber raw material and the mixed solution is (1:1)-(1:20).

14. The lignin adhesive according to claim 9, wherein in the method for preparing the lignin adhesive, the wood fiber raw material is mixed with the mixed solution and reacts at 80° C.-140° C. for 10 min-300 min.

15. The lignin adhesive according to claim 9, wherein in the method for preparing the lignin adhesive, the organic solvent is an ethanol or acetone aqueous solution with a volume concentration of 10%-100%, and an amount of the organic solvent added is 2-10 times a volume of the mixed solution.

16. The lignin adhesive according to claim 9, wherein the method for preparing the lignin adhesive comprises the following steps:

1) a preparation of the mixed solution mixing the hydrogen bond receptor, the polyol, and the organic polyacid, heating at 50° C.-110° C. and stirring continuously until a clarified and homogeneous mixed solution is formed; wherein the hydrogen bond receptor is selected from choline chloride, benzyltrimethylammonium chloride, and betaine; the polyol is selected from 1, 2-butanediol, 1, 2-pentanediol, 1, 5-pentanediol, 1, 3-propanediol, and 1, 4-butanediol; and the organic polyacid is selected from maleic acid, succinic acid, malonic acid, and other polyacids; a molar ratio of the hydrogen bond receptor to the polyol, to the organic polyacid is (0.1-5):(0.1-5):(0.1-5);

2) the treatment of the wood fiber raw material weighing the wood fiber raw material and mixing the wood fiber raw material with the mixed solution in proportion, conducting a reaction at 90° C.-140° C. for 10 min-300 min; after the reaction, adding the organic solvent into a system, stirring well, achieving the solid-liquid separation by filtering to obtain a pretreated material and a pretreated solution;

3) a separation of the lignin adhesive performing the solid-liquid separation to obtain a lignin-rich pretreated solution and the pretreated material; washing the pretreated material with distilled water to neutral and then recycling; subjecting the lignin-rich pretreated solution to the rotary evaporation to remove the organic solvent, adding appropriate deionized water to precipitate lignin, then centrifuging to separate and obtain the lignin adhesive.

* * * * *